(12) United States Patent
Li et al.

(10) Patent No.: US 11,113,387 B2
(45) Date of Patent: Sep. 7, 2021

(54) METHOD AND APPARATUS FOR IMPROVING SECURITY OF JAVA SANDBOX

(71) Applicant: ALIBABA GROUP HOLDING LIMITED, Grand Cayman (KY)

(72) Inventors: Xuefeng Li, Hangzhou (CN); Yanbing Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 303 days.

(21) Appl. No.: 15/989,087

(22) Filed: May 24, 2018

(65) Prior Publication Data

US 2018/0268134 A1    Sep. 20, 2018

Related U.S. Application Data

(63) Continuation of application No. PCT/CN2016/105822, filed on Nov. 15, 2016.

(30) Foreign Application Priority Data

Nov. 24, 2015    (CN) .......................... 201510827728.6

(51) Int. Cl.
*G06F 21/53*    (2013.01)
*G06F 9/445*    (2018.01)
(Continued)

(52) U.S. Cl.
CPC .......... *G06F 21/53* (2013.01); *G06F 9/44589* (2013.01); *G06F 21/577* (2013.01); *G06F 9/45504* (2013.01); *G06F 2221/033* (2013.01)

(58) Field of Classification Search
USPC ............ 726/1, 2, 21, 36; 713/150, 163, 181; 380/255, 264, 276
See application file for complete search history.

(56) References Cited

U.S. PATENT DOCUMENTS

| | | | |
|---|---|---|---|
| 6,836,888 B1 | 12/2004 | Basu et al. | |
| 2006/0005019 A1* | 1/2006 | Chao ....................... | G06F 21/52 713/166 |

(Continued)

FOREIGN PATENT DOCUMENTS

| | | |
|---|---|---|
| CN | 103136470 A | 6/2013 |
| CN | 103593605 A | 2/2014 |

(Continued)

OTHER PUBLICATIONS

PCT International Search Report and Written Opinion dated Feb. 6, 2017, issued in corresponding International Application No. PCT/CN2016/105822 (13 pgs.).

*Primary Examiner* — Sharif E Ullah
(74) *Attorney, Agent, or Firm* — Finnegan, Henderson, Farabow, Garrett & Dunner, LLP

(57) ABSTRACT

A method and apparatus for improving security of a Java sandbox is provided. The method includes performing a permission check on a to-be-checked code, determining whether a method bypassing the permission check exists in a call stack of the code, and if a method bypassing the permission check exists, determining whether methods in the call stack have a signature. The method also includes determining that the to-be-checked code has a security problem if the methods have no signature.

10 Claims, 6 Drawing Sheets

(51) Int. Cl.
*G06F 21/57* (2013.01)
*G06F 9/455* (2018.01)

(56) References Cited

U.S. PATENT DOCUMENTS

| | | | | |
|---|---|---|---|---|
| 2007/0261124 | A1* | 11/2007 | Centonze | G06F 21/6227 726/27 |
| 2009/0254572 | A1* | 10/2009 | Redlich | G06Q 10/06 |
| 2010/0037317 | A1* | 2/2010 | Oh | G06F 21/554 726/23 |
| 2010/0250497 | A1* | 9/2010 | Redlich | H04L 63/0227 707/661 |
| 2014/0052998 | A1* | 2/2014 | Bloom | G06F 21/554 713/189 |
| 2015/0161381 | A1* | 6/2015 | Sun | G06F 21/53 726/22 |

FOREIGN PATENT DOCUMENTS

| | | |
|---|---|---|
| CN | 104216741 A | 12/2014 |
| WO | WO 2017088682 A1 | 6/2017 |

* cited by examiner

METHOD AND APPARATUS FOR IMPROVING SECURITY OF JAVA SANDBOX

CROSS-REFERENCE TO RELATED APPLICATION

The present application claims priority to International Application No. PCT/CN2016/105822, filed on Nov. 15, 2016, which claims priority to and the benefits of priority to Chinese Patent Application No. 201510827728.6 filed on Nov. 24, 2015, both of which are incorporated herein by reference in their entireties.

TECHNICAL FIELD

The present application relates to the field of computer security technologies, and in particular, to a method and an apparatus for improving security of a Java sandbox.

BACKGROUND

In a cloud computing scenario, when code is compiled in Java, a cloud computing platform usually executes the code in a Java sandbox because the code generally has a lot of security problems (such as an attack code from a hacker).

The Java sandbox provides an execution environment in which code permission is limited based on a policy file. When the Java sandbox calls a method checkPermission in the process of running a code, a Security Manager of the Java sandbox carries out a permission check on the code. The permission check is used for determining whether a method at each layer of a call stack has the permission in the policy file when the code is run. The permission may include whether writing is allowed, whether reading is allowed, whether using a network is allowed, and so on. If the method at each layer of the call stack has the permission, the code is considered as safe. If the method at any layer of the call stack does not have the permission, the code is considered as unsafe.

In the prior art, the cloud computing platform provides a privileged method of the platform. The privileged method has a system domain, and the security manager does not carry out a permission check on a method having a system domain. Therefore, the privileged method can bypass the permission check step of the security manager. Generally, a code of a user is not allowed to directly call the privileged method, and can only call the privileged method indirectly by means of a trusted method (a method having a signature). However, a malicious user can cause a code to directly call the privileged method by means of reflection, privilege escalation, and so on. A code directly calling the privileged method also has the system domain, and therefore can bypass the permission check of the security manager. As such, the code of the malicious user breaches the protection of the Java sandbox.

In summary, there is a problem of low security of the Java sandbox in the prior art.

SUMMARY

In accordance with the present disclosure, there is provided a method for improving security of a Java sandbox. The method includes performing a permission check on a to-be-checked code, determining whether a method bypassing the permission check exists in a call stack of the code, and in response to a method bypassing the permission check existing, determining whether methods in the call stack have a signature. The method also includes processing the to-be-checked code based on the determination whether the methods in the call stack have the signature.

In accordance with the present disclosure, there is provided an apparatus for improving security of a Java sandbox. The apparatus includes a check module configured to perform a permission check on a to-be-checked code, a first determining module configured to determine whether a method bypassing the permission check exists in a call stack of the code, and a second determining module configured to, when a method bypassing the permission check exists in the call stack of the code, determine whether methods in the call stack have a signature. The apparatus also includes a third determining module configured to determine that the to-be-checked code has a security problem when the methods in the call stack have no signature.

In accordance with the present disclosure, there is provided a non-transitory computer-readable medium storing a set of one or more instructions that is executable by one or more processors of a computer system to perform a method. The method includes performing a permission check on a to-be-checked code, determining whether a method bypassing the permission check exists in a call stack of the code, and in response to a method bypassing the permission check existing, determining whether methods in the call stack have a signature. The method also includes processing the to-be-checked code based on the determination whether the methods in the call stack have the signature.

BRIEF DESCRIPTION OF THE DRAWINGS

In order to illustrate technical solutions in the embodiments of the present application or in the prior art more clearly, accompanying drawings required for describing the embodiments or the prior art are introduced briefly below. It is apparent that the accompanying drawings in the following description are merely some embodiments recorded in the present application. Those of ordinary skill in the art can further obtain other drawings based on these accompanying drawings without creative efforts.

DETAILED DESCRIPTION

In order to help those skilled in the art better understand technical solutions in the present application, the technical solutions in the embodiments of the present application are clearly and completely described below with reference to the accompanying drawings in the embodiments of the present application. It is apparent that the embodiments described are merely some embodiments rather than all embodiments of the present application. Based on the embodiments in the present application, all other embodiments obtained by those of ordinary skill in the art without creative efforts should belong to the protection scope of the present application.

Figure 1:
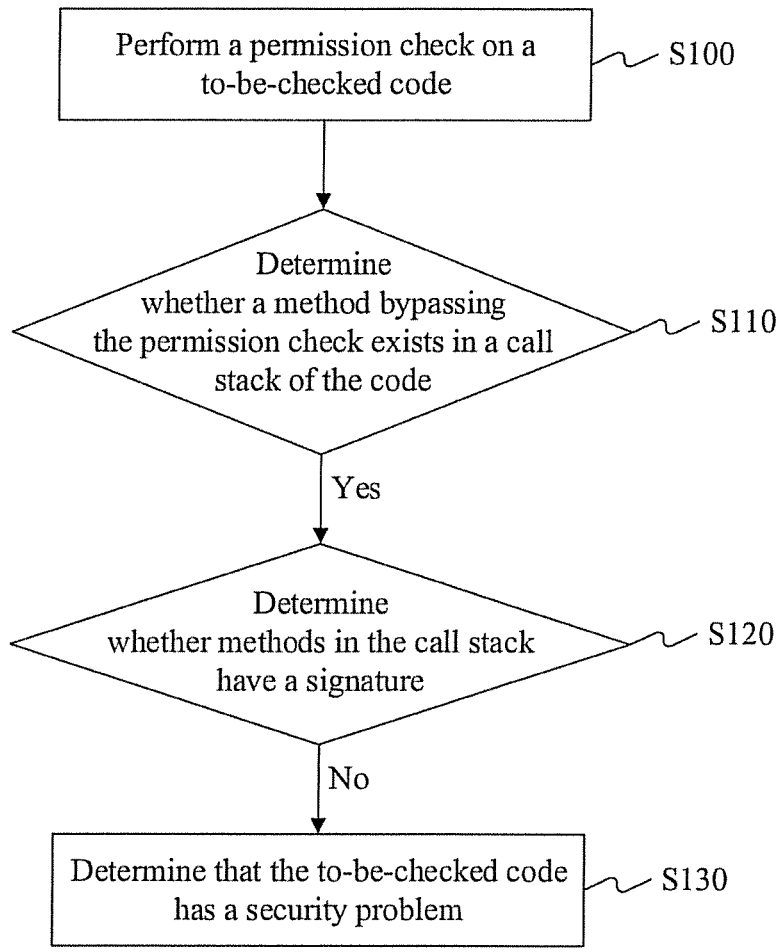
FIG. 1 is a flowchart of a method for improving security of a Java sandbox according to embodiments of the present application.

FIG. 1 is a flowchart of a method for improving security of a Java sandbox according to embodiments of the present application. In some embodiments, the method includes the following steps S100-S130:

In step S100, a permission check is performed on a to-be-checked code. In the embodiments of the present application, the to-be-checked code is a code compiled by a user in Java. The code contains a user method. As described above, when a Java sandbox calls a method checkPermission in the process of running the to-be-checked code, a security manager carries out a permission check on the to-be-checked code. The permission check is used for determining whether a method at each layer of a call stack has the permission in a policy file when the code is run. The permission may include whether writing is allowed, whether reading is allowed, whether using a network is allowed, and so on. If the method at each layer of the call stack has the permission, the code is considered safe. If the method at any layer of the call stack does not have the permission, the code is considered unsafe.

Example 1 below shows, in a cloud computing scenario, a call stack of an operation by a user to open a file named "filename" by using a method main( ):

| | |
|---|---|
| com.alibaba.apsara.sandking.SecurityManage.checkPermission(FILE_READ_ACTION) | Layer 0 |
| com.alibaba.apsara.sandking.SecurityManage.checkRead(filename) | Layer 1 |
| java.io.FileInputStream.FileInputStream(filename) | Layer 2 |
| com.readwrapper(filename) | Layer 3 |
| usercode.main( ) | Layer 4 |

As shown above, a calling process of the call stack is as follows: first, the method main( ) at Layer 4 calls the method readwrapper(filename) at Layer 3, which calls the method FileInputSteam(filename) at Layer 2, which calls the method checkRead(filename) at Layer 1, which then calls the method checkPermission(FILE_READ_ACTION) at Layer 0. In the call stack, the method main( ) at Layer 4 is a user method; the method readwrapper( ) at Layer 3 is a public method of the cloud computing platform (a trusted method having a signature "alibaba"); the method FileInputSteam( ) at Layer 2 is a Java system method; the method checkRead( ) at Layer 1 is a Java sandbox method; and the method checkPermission( ) at Layer 0 is a Java sandbox method. After the cheekPermission(FILE_READ_ACTION) at Layer 0 is triggered, a permission check is carried out. The permission check acquires, from a policy file, a permission of whether a read operation is allowed, so as to check the method at each layer of the call stack. The methods at Layer 0 and Layer 1 are Java sandbox methods that have a read permission. The method at Layer 2 is a Java system method that also has a read permission. The method at Layer 3 is a public method that has a read permission as well. The method at Layer 4 is a user method. As a read permission is needed to open a file, if the policy file allows reading, the method at Layer 4 can acquire the read permission, i.e., the method at Layer 4 has the read permission. As such, the method at each layer of the call stack has the permission; therefore, the to-be-checked code is safe, and the user can open the file named "filename" in the cloud computing platform. On the contrary, if the policy file does not allow the read operation, the method at Layer 4 cannot acquire the read permission, i.e., the method at Layer 4 does not have the read permission. As such, there is a method without the permission existing in the call stack; therefore, the to-be-checked code is unsafe, and the user cannot open the file named "filename" in the cloud computing platform.

Example 2 below shows, in a cloud computing scenario, a call stack of an operation by a user to open a file named "filename" by using a method main( ) when the cloud computing platform provides a privileged method doPrivileged( )

| | |
|---|---|
| com.alibaba.apsara.sandking.SecurityManage.checkPermission(FILE_READ_ACTION) | Layer 0 |
| com.alibaba.apsara.sandking.SecurityManage.checkRead(filename) | Layer 1 |
| java.io.FileInputStream.FileInputStream(filename) | Layer 2 |
| com.readwrapper(filename) | Layer 3 |
| java.security.AccessController.doPrivileged( ) | Layer 4 |
| com.alibaba.privilegedwrapper( ) | Layer 5 |
| usercode.main( ) | Layer 6 |

This call stack differs from the call stack in Example 1 above in that the method privilegedwrapper( ) at Layer 5 and the method doPrivileged( ) at Layer 4 are added before the method main( ) calls the method readwrapper(filename). That is, the method main( ) at Layer 6 calls the method privilegedwrapper( ) at Layer 5, which calls the method doPrivileged( ) at Layer 4, which then calls the method readwrapper(filename) at Layer 3. In this call stack, the method main( ) at Layer 6 is a user method; the method privilegedwrapper( ) at Layer 5 and the readwrapper(filename) at Layer 3 are public methods of the cloud computing platform; the method doPrivileged( ) at Layer 4 is a privileged method of the cloud computing platform; the method FileInputSteam(filename) at Layer 2 is a Java system method; the method checkRead( ) at Layer 1 is a Java sandbox method; and the method checkPermission( ) at Layer 0 is a Java sandbox method. After the checkPermission(FILE_READ_ACTION) at Layer 0 is triggered, a permission check is carried out. This permission check differs from the permission check of the foregoing example in that the method doPrivileged( ) at Layer 4 is a privileged method that can bypass the permission check; the method privilegedwrapper( ) at Layer 5 calls the privileged method at Layer 4, and can also bypass the permission check. The method privilegedwrapper( ) at Layer 5 is a public method of the cloud computing platform, and has the read permission itself. Therefore, even though the method at Layer 5 bypasses the permission check, it does not affect the check on the method main( ) at Layer 6.

Example 3 below shows a call stack of an operation that a user in a cloud computing scenario uses a method main( ) to directly call a privileged method doPrivileged( ) provided by the cloud computing platform, to open a file named "filename":

| | |
|---|---|
| com.alibaba.apsara.sandking.SecurityManage.checkPermission(FILE_READ_ACTION) | Layer 0 |
| com.alibaba.apsara.sandking.SecurityManage.checkRead(filename) | Layer 1 |
| java.io.FileInputStream.FileInputStream(filename) | Layer 2 |
| com.readwrapper(filename) | Layer 3 |
| java.security.AccessController.doPrivileged( ) | Layer 4 |
| usercode.main( ) | Layer 5 |

This call stack differs from the call stack in Example 2 above in that the method main( ) directly calls the privileged method doPrivileged( ) That is, the method main( ) at Layer 5 calls the method doPrivileged( ) at Layer 4. During the permission check, as the method doPrivileged( ) at Layer 4 is a privileged method that can bypass the permission check, the method main( ) at Layer 5 that calls the privileged method can also bypass the permission check. The methods at Layer 0 and Layer 1 are Java sandbox methods that have the read permission, the method at Layer 2 is a Java system method that also has the read permission, and the method at Layer 3 is a public method that has the read permission as well. Layer 4 and Layer 5 bypass the permission check. As such, even if the policy file does not allow a read operation, the Layers can all pass the permission check all the time. Therefore, the security manager concludes that the to-be-checked code is safe. As such, the user method main can still open the file named "filename" in the cloud computing platform even without the read permission.

In step S110, it is determined whether a method bypassing the permission check exists in a call stack of the code, and S120 is performed if a method bypassing the permission check exists. In some embodiments, the security manager determines whether a method bypassing the permission check exists in a call stack of the code. As shown in Example 1 above, as no method bypassing the permission check exists in the call stack, the security manager can determine whether the to-be-checked code is safe based on the result of the permission check. That is, if the to-be-checked code passes the permission check, the security manager can determine the to-be-checked code as safe; if the to-be-checked code does not pass the permission check, the security manager can determine that the to-be-checked code has a security problem.

As shown in Example 2 above, as methods (doPrivileged( ) and privilegedwrapper( ) bypassing the permission check exist in the call stack, step S120 is performed.

As shown in Example 3 above, as methods (doPrivileged( ) and main( ) bypassing the permission check exist in the call stack, step S120 is performed.

In step S120, it is determined whether the methods in the call stack have a signature, and step S130 is performed if the methods have no signature. Continuing with Example 2, Layer 6 has no signature, Layer 5 has a signature "alibaba," Layer 4 has no signature, Layer 3 has no signature, Layer 2 has no signature, Layer 1 has no signature, and Layer 0 has no signature. The method at Layer 5 in the call stack has the signature "alibaba," and therefore, the security manager determines that the to-be-checked code passes the permission check. That is, the to-be-checked code is safe.

Continuing with Example 3, Layer 5 has no signature, Layer 4 has no signature, Layer 3 has no signature, Layer 2 has no signature, Layer 1 has no signature, and Layer 0 has no signature. There is no signature in the call stack when the security manager determines whether the methods in the call stack have a signature. Therefore, step S130 is performed.

In step S130, it is determined that the to-be-checked code has a security problem. The security manager can throw a security exception when determining that the to-be-checked code has a security problem, and can thereby terminate calling of the to-be-checked code. In Example 3, the user may be unable to open the file named "filename" in the cloud computing platform.

In some embodiments, by checking a signature in a call stack where a method bypassing the permission check exists, if the methods in the call stack have no signature, the to-be-checked code may be determined to have a security problem. As such, calling a privileged method to bypass the permission check is avoided, and thus the security of the Java sandbox is improved.

In Example 3, if the method readwrapper( ) at Layer 3 also has a signature (a public method provided by a cloud computing platform may have a signature in an actual application), the security manager can conclude that the to-be-checked code passes the permission check; that is, the to-be-checked code is safe. However, in Example 3, the user method main( ) at Layer 5 calls the privileged method doPrivileged( ) at Layer 4 directly, and it is unreasonable to conclude that the to-be-checked code is safe.

Figure 2:
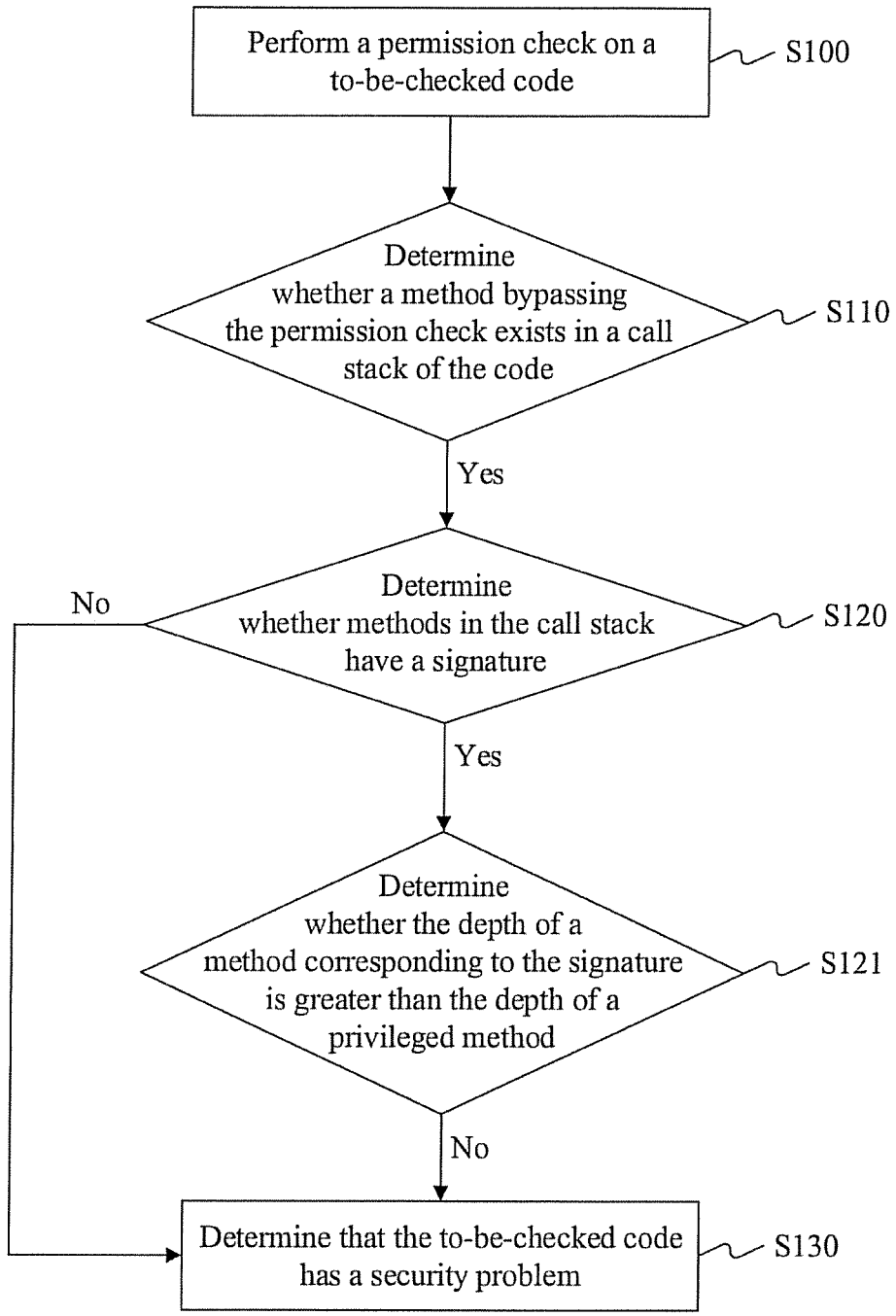
FIG. 2 is a flowchart of a method for improving security of a Java sandbox according to embodiments of the present application.

In order to solve the foregoing problem that the Java sandbox cannot detect that the user method calls the privileged method directly when the public method in the call stack has a signature, as shown in FIG. 2, after the step of determining whether the methods in the call stack have a signature, the method may further include the following steps:

In step S121, if the methods have a signature, it is determined whether the depth of a method corresponding to the signature is greater than the depth of the privileged method, and S130 is performed if the depth of the method corresponding to the signature is not greater than the depth of the privileged method. In these embodiments, the depth is a layer number of a method in the call stack. For example, if a method is located at Layer 3 in the call stack, the depth of the method is 3.

Based on Example 2 above, if the method readwrapper( ) at Layer 3 also has the signature "alibaba," the call stack is as follows:

| | |
|---|---|
| com.alibaba.apsara.sandking.SecurityManage.checkPermission(FILE_READ_ACTION) | Layer 0 |
| com.alibaba.apsara.sandking.SecurityManage.checkRead(filename) | Layer 1 |
| java.io.FileInputStream.FileInputStream(filename) | Layer 2 |
| com.alibaba.readwrapper(file name) | Layer 3 |
| java.security.AccessController.doPrivileged( ) | Layer 4 |
| com.alibaba.privilegedwrapper( ) | Layer 5 |
| usercode.main( ) | Layer 6 |

In the call stack, the depth of the method readwrapper( ) corresponding to the signature is 3, the depth of the method privilegedwrapper( ) corresponding to the signature is 5, and the depth of the privileged method doPrivileged( ) is 4. The depth of the method privilegedwrapper( ) is greater than the depth of the privileged method doPrivileged( ) Therefore, the security manager determines that the to-be-checked code passes the permission check. That is, the to-be-checked code is safe.

Based on Example 3 above, if the method readwrapper( ) at Layer 3 also has the signature "alibaba," the call stack is as follows:

| | |
|---|---|
| com.alibaba.apsara.sandking.SecurityManage.checkPermission(FILE_READ_ACTION) | Layer 0 |
| com.alibaba.apsara.sandking.SecurityManage.checkRead(filename) | Layer 1 |
| java.io.FileInputStream.FileInputStream(filename) | Layer 2 |
| com.alibaba.readwrapper(filename) | Layer 3 |
| java.security.AccessController.doPrivileged( ) | Layer 4 |
| usercode.main( ) | Layer 5 |

In the call stack, the depth of the method readwrapper( ) corresponding to the signature is 3, and the depth of the privileged method doPrivileged( ) is 4. The depth of the method readwrapper( ) is less than the depth of the privileged method doPrivileged( ) Therefore, the security manager performs step S130; that is, it determines that the to-be-checked code has a security problem.

Figure 3:
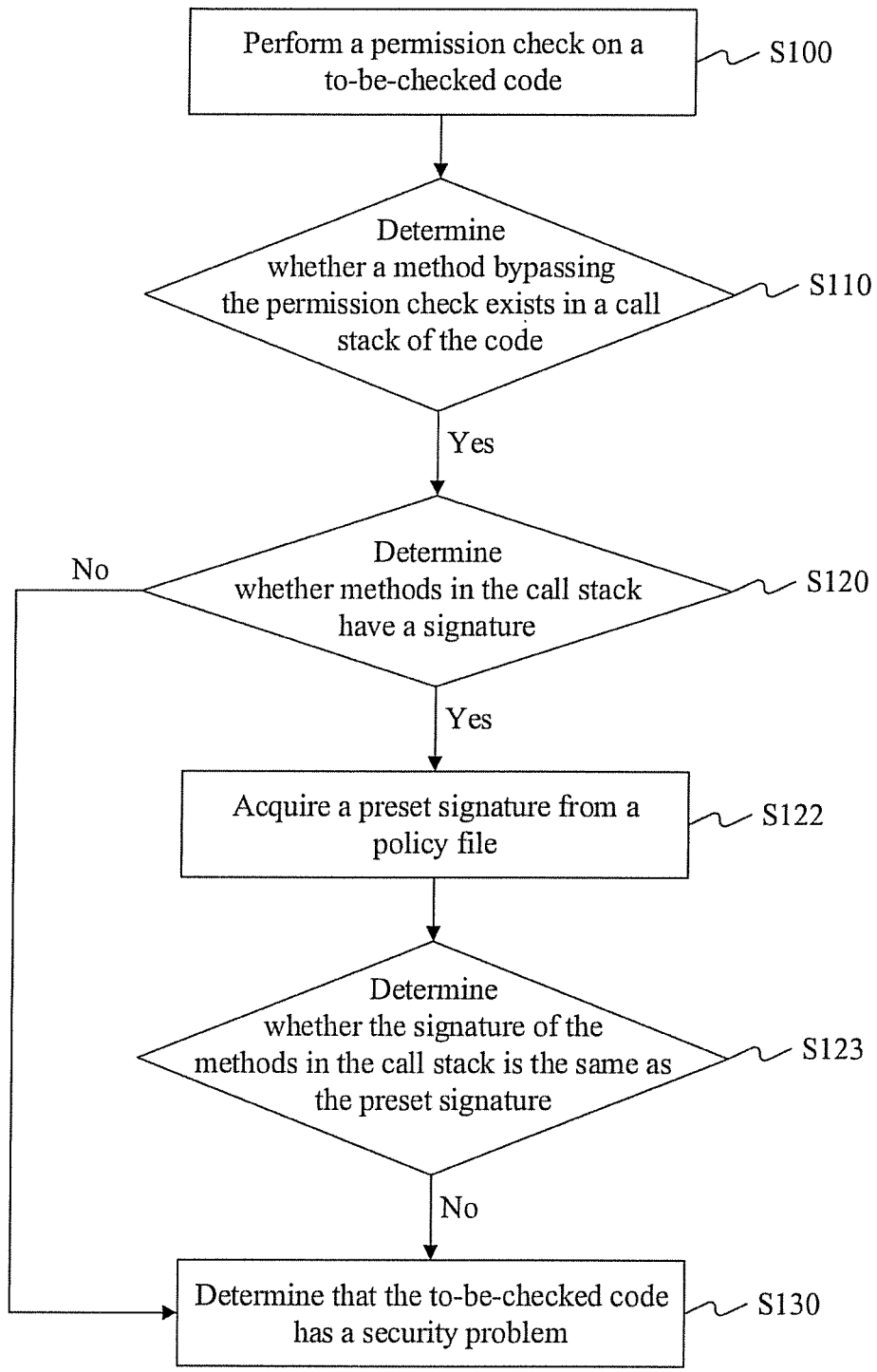
FIG. 3 is a flowchart of a method for improving security of a Java sandbox according to embodiments of the present application.

In some embodiments of the present application, as shown in FIG. 3, after the step of determining whether the methods in the call stack have a signature, the method may further include the following steps.

In step S122, a preset signature is acquired from a policy file if the methods have a signature.

In step S123, it is determined whether the signature of the methods in the call stack is the same as the preset signature. If the signature of the methods in the call stack is not the same as the preset signature, step S130 is performed.

In an actual application, the cloud computing platform generally only accepts a signature provided by the platform, and does not accept signatures provided by other platforms. Alternatively, the cloud computing platform only accepts signatures allowed by the platform, and does not accept other signatures.

In these embodiments, the preset signature can be pre-configured in the policy file artificially. It is assumed that the signature of the method privilegedwrapper( ) at Layer 5 in the call stack shown in Example 2 is "AAA." The preset signature is "alibaba," and then, as the signature "AAA" is not the same as the preset signature "alibaba," step S130 is performed, i.e., it is determined that the to-be-checked code has a security problem.

Figure 4:
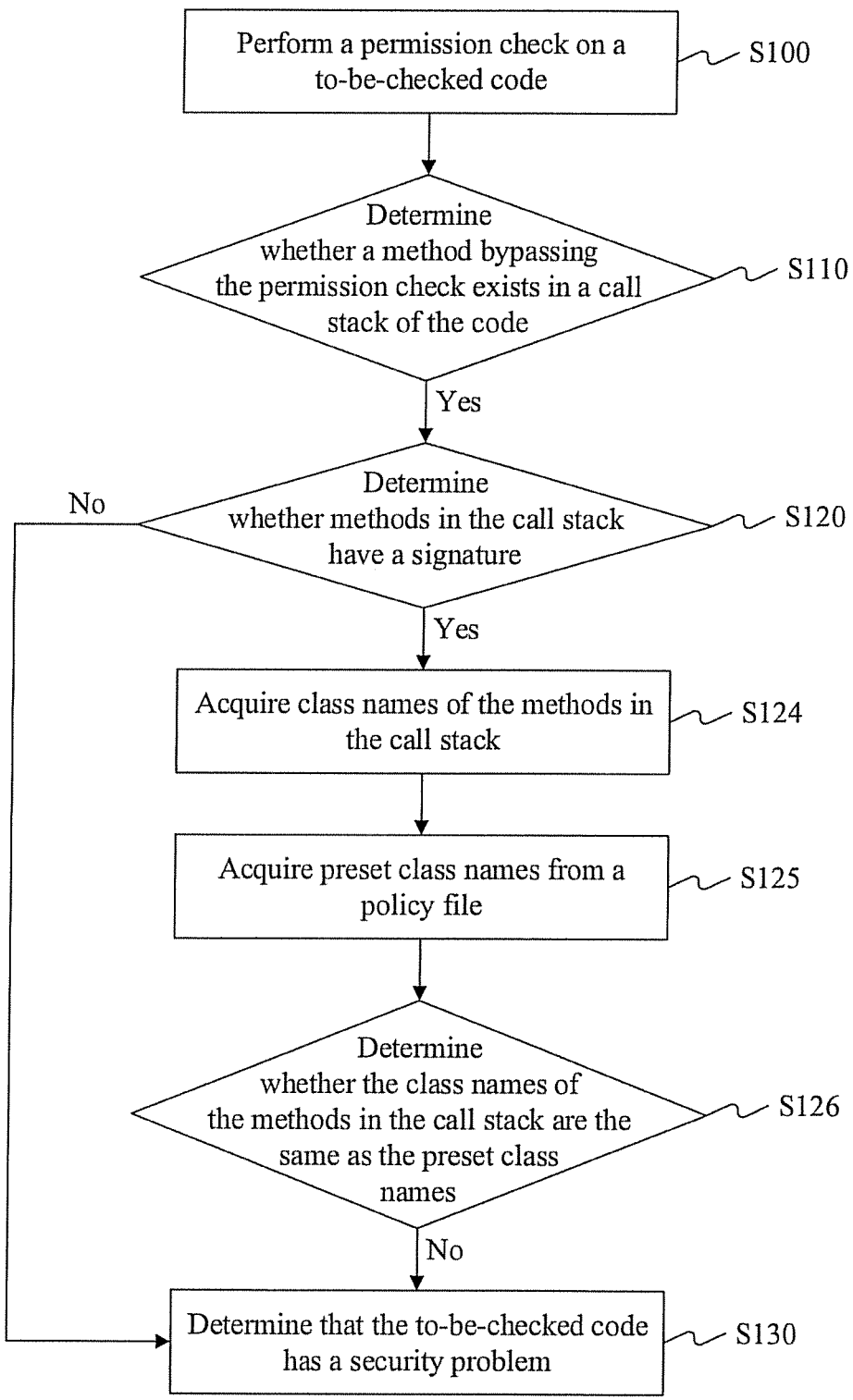
FIG. 4 is a flowchart of a method for improving security of a Java sandbox according to embodiments of the present application.

In some embodiments of the present application, as shown in FIG. 4, after the step of determining whether the methods in the call stack have a signature, the method may further include the following steps.

In step S124, class names of the methods in the call stack are acquired if the methods have a signature.

In step S125, preset class names are acquired from a policy file.

In step S126, it is determined whether the class names of the methods in the call stack are the same as the preset class names. If the class names of the methods in the call stack are not the same as the preset class names, step S130 is performed.

In an actual application, similar to the above embodiment, the cloud computing platform generally only accepts class names allowed by the platform, and does not accept class names other than the allowed class names.

In these embodiments, the preset class names may be pre-configured in the policy file artificially. For example, class names of the methods in the call stack are as follows: the class name of Layer 0 is classA, the class name of Layer 1 is classB, and the class name of Layer 2 is classC. If the preset class names acquired from the policy file are classA, classB, classC, and classD, all the class names of the methods in the call stack are the same as the preset class names. Therefore, the security manager can determine that the to-be-checked code is safe. If the preset class names acquired from the policy file are classA, classC, and classD, the class name classB of the method in the call stack is not the same as the preset class names, and therefore step S130 is performed, i.e., it is determined that the to-be-checked code has a security problem.

Figure 5:
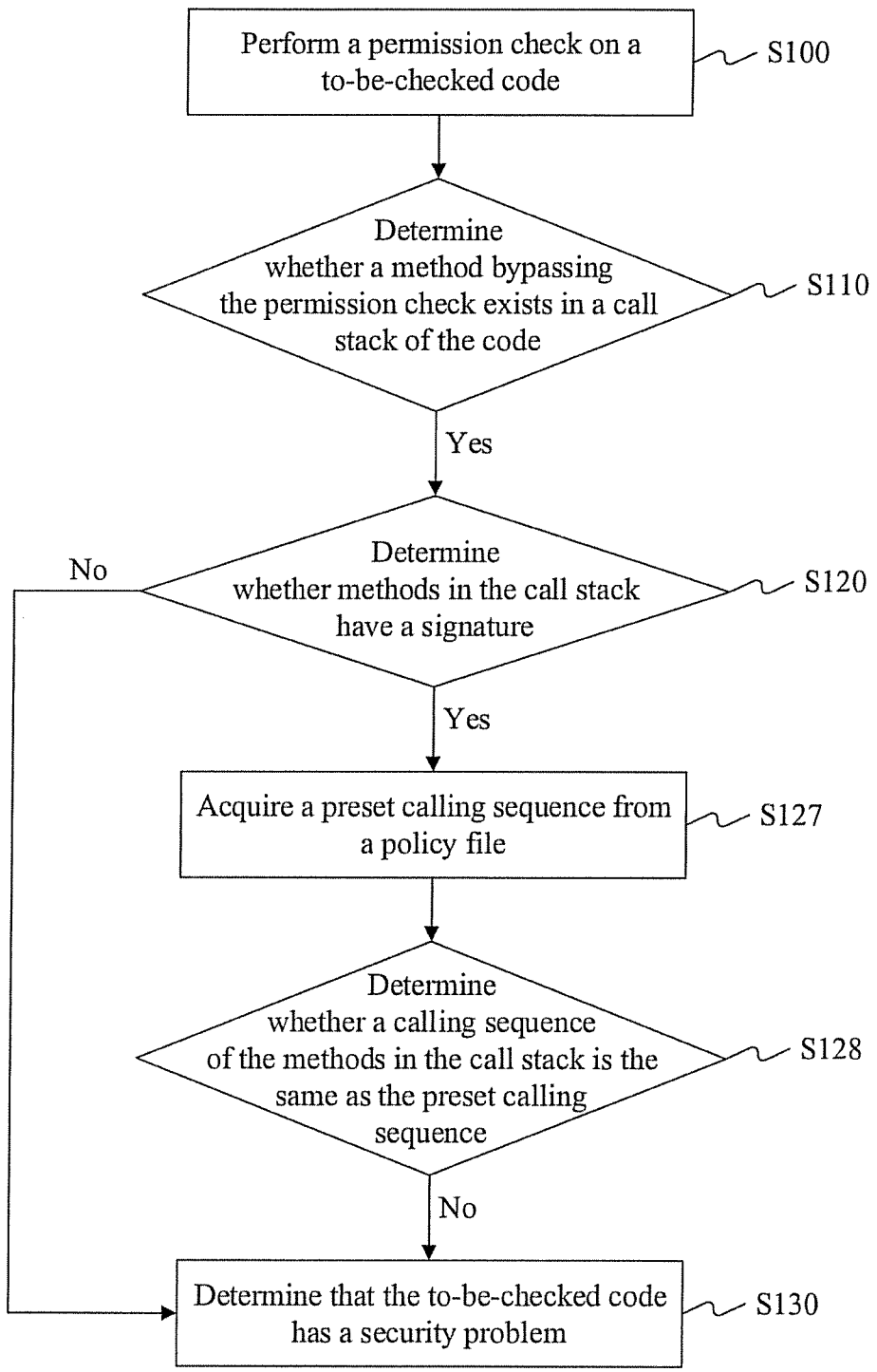
FIG. 5 is a flowchart of a method for improving security of a Java sandbox according to embodiments of the present application.

In some embodiments of the present application, as shown in FIG. 5, after the step of determining whether the methods in the call stack have a signature, the method may further include the following steps.

In step S127, a preset calling sequence is acquired from a policy file if the methods have a signature.

In step S128, it is determined whether a calling sequence of the methods in the call stack is the same as the preset calling sequence. If the calling sequence of the methods in the call stack is not the same as the preset calling sequence, step S130 is performed.

In these embodiments, the preset calling sequence may be pre-configured in the policy file artificially. For example, if the calling sequence of the methods in the call stack of the to-be-checked code is: A calls B, which then calls C, while the preset calling sequence acquired from the policy file is: A calls D, which then calls C, the server performs step S130 because the calling sequence of the methods in the call stack is not the same as the preset calling sequence, i.e., the server determines that the to-be-checked code has a security problem.

Some embodiments of the present application further provide an apparatus that can implement the foregoing method steps. The apparatus can be implemented by software, or hardware, or a combination of software and hardware. Using a software implementation manner as an example, a Central Process Unit (CPU) of a server reads a corresponding computer program instruction into a memory and runs the instruction to form the apparatus in a logic sense.

Figure 6:
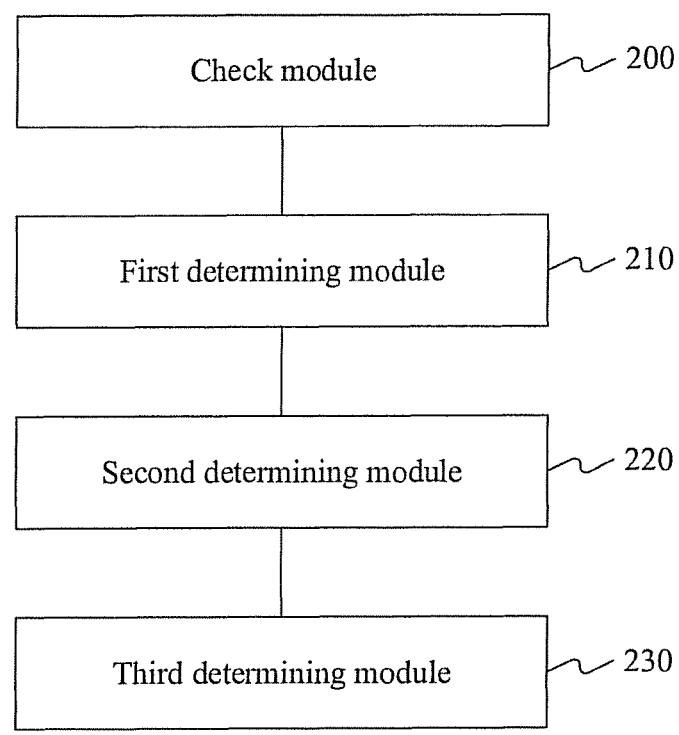
FIG. 6 is a schematic modular diagram of an apparatus for improving security of a Java sandbox according to embodiments of the present application.

FIG. 6 is a schematic modular diagram of an apparatus for improving security of a Java sandbox according to embodiments of the present application. In these embodiments, the apparatus includes: a check module 200 configured to perform a permission check on a to-be-checked code; a first determining module 210 configured to determine whether a method bypassing the permission check exists in a call stack of the code; a second determining module 220 configured to, when a method bypassing the permission check exists in the call stack of the code, determine whether methods in the call stack have a signature; and a third determining module 230 configured to determine that the to-be-checked code has a security problem when the methods in the call stack have no signature.

In some embodiments, after the second determining module 220, the apparatus may further include a first determining submodule configured to, when the methods in the call stack have a signature, determine whether the depth of a method corresponding to the signature is greater than the depth of a privileged method. Correspondingly, the third determining module 230 is further configured to determine that the to-be-checked code has a security problem when the depth of the method corresponding to the signature is not greater than the depth of the privileged method.

In some embodiments, after the second determining module 220, the apparatus may further include: a first acquiring submodule configured to acquire a preset signature from a policy file when the methods in the call stack have a signature; and a second determining submodule configured to determine whether the signature of the methods in the call stack is the same as the preset signature. Correspondingly, the third determining module 230 is further configured to determine that the to-be-checked code has a security problem when the signature of the methods in the call stack is not the same as the preset signature.

In some embodiments, after the second determining module 220, the apparatus may further include: a second acquiring submodule configured to acquire class names of the methods in the call stack when the methods in the call stack have a signature; a third acquiring submodule configured to acquire preset class names from a policy file; and a third determining submodule configured to determine whether the class names of the methods in the call stack are the same as the preset class names. Correspondingly, the third determining module 230 is further configured to determine that the to-be-checked code has a security problem when the class names of the methods in the call stack are not the same as the preset class names.

In some embodiments, after the second determining module 220, the apparatus may further include: a fourth acquiring submodule configured to acquire a preset calling sequence from a policy file when the methods in the call stack have a signature; and a fourth determining submodule configured to determine whether a calling sequence of the methods in the call stack is the same as the preset calling sequence. Correspondingly, the third determining module 230 is further configured to determine that the to-be-checked code has a security problem when the calling sequence of the methods in the call stack is not the same as the preset calling sequence.

In the method for improving security of a Java sandbox provided by the embodiments of the present application, a permission check is performed on a to-be-checked code. It is determined whether a method bypassing the permission check exists in a call stack of the code. If it is determined that a method bypassing the permission check exists in a call stack, it is determined whether methods in the call stack have a signature. When the methods in the call stack have no signature, it is determined that the to-be-checked code has a security problem. Therefore, the security of the Java sandbox is improved.

Improvements on many method procedures at present can be considered as direct improvements on hardware circuit structures. Almost all designers program improved method procedures into hardware circuits to obtain corresponding hardware circuit structures. Therefore, it is improper to assume that an improvement on a method procedure cannot be implemented by using a hardware entity module. For example, a Programmable Logic Device (PLD) (such as a Field Programmable Gate Array (FPGA)) is such an integrated circuit whose logic functions are determined by devices programming by a user. Designers program by themselves to "integrate" a digital system into a piece of PLD, without the need to ask a chip manufacturer to design and manufacture a dedicated integrated circuit chip. Moreover, the programming is mostly implemented by using "logic compiler" software at present, instead of manually manufacturing an integrated circuit chip. The logic compiler software is similar to a software complier used for developing and writing a program, and original code (before compiling) is written in a specific programming language, which is referred to as a Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog are the most commonly used now. It is appreciated that a hardware circuit for implementing a logic method procedure may be easily obtained by slightly logically programming the method procedure and programming it into an integrated circuit using the above several hardware description languages.

A controller can be implemented in any suitable manner. For example, the controller may be in the form of a microprocessor or a processor and a computer readable medium storing a computer readable program code (for example, software or firmware) executable by the (micro) processor, a logic gate, a switch, an Application Specific Integrated Circuit (ASIC), a programmable logic controller, and an embedded micro-controller. Examples of the controller include, but are not limited to, the following microcontrollers: ARC 625D, Atmel AT91SAM, Microchip PIC18F26K20, and Silicone Labs C8051F320. A memory controller can also be implemented as a part of control logic of a memory. It is appreciated that the controller can be implemented by using pure computer readable program codes, and in addition, the method steps can be logically programmed to enable the controller to implement the same function in the form of a logic gate, a switch, an ASIC, a programmable logic controller and an embedded microcontroller. Therefore, this type of controller can be considered as a hardware component, and apparatuses included in the controller for implementing various functions can also be considered as structures inside the hardware component. Or, the apparatuses used for implementing various functions can be considered as both software modules for implementing the method and structures inside the hardware component.

The system, apparatus, module or unit illustrated in the above embodiments may be specifically implemented by using a computer chip or an entity, or a product having a certain function.

For ease of description, when the apparatus is described, it is divided into various units based on functions for respective description. Definitely, when the present application is implemented, functions of the units may be implemented in the same or multiple pieces of software and/or hardware.

Those skilled in the art should understand that the embodiments of the present disclosure may be provided as a method, a system, or a computer program product. Therefore, the embodiments may be implemented as a complete hardware embodiment, a complete software embodiment, or an embodiment combining software and hardware. Moreover, the embodiments may be a computer program product implemented on one or more computer usable storage media (including, but not limited to, a magnetic disk memory, a CD-ROM, an optical memory, and the like) including computer usable program codes.

The embodiments are described with reference to flowcharts and/or block diagrams of the method, device (system) and computer program product. It should be understood that a computer program instruction may be used to implement each process and/or block in the flowcharts and/or block diagrams and combinations of processes and/or blocks in the flowcharts and/or block diagrams. These computer program instructions may be provided to a computer, an embedded processor, or a processor of another programmable data processing device to generate a machine, so that the instructions executed by the computer or the processor of another programmable data processing device generate an apparatus for implementing a function specified in one or more processes in the flowcharts and/or in one or more blocks in the block diagrams.

These computer program instructions may also be stored in a computer readable memory that can instruct a computer or another programmable data processing device to work in a particular manner, such that the instructions stored in the computer readable memory generate a product that includes an instruction apparatus. The instruction apparatus implements a function specified in one or more processes in the flowcharts and/or in one or more blocks in the block diagrams.

These computer program instructions may also be loaded onto a computer or another programmable data processing device, such that a series of operation steps are performed on the computer or another programmable device, thereby generating computer-implemented processing. Therefore, the instructions executed on the computer or another programmable device provide steps for implementing a function specified in one or more processes in the flowcharts and/or in one or more blocks in the block diagrams.

In a typical configuration, a computation device includes one or more central processing units (CPUs), an I/O interface, a network interface, and a memory.

The memory may include computer readable media such as a volatile memory, a Random Access Memory (RAM), and/or a non-volatile memory, e.g., Read-Only Memory (ROM) or flash RAM. The memory is an example of a computer readable medium.

The computer readable medium includes non-volatile and volatile media as well as movable and non-movable media, and can implement information storage by means of any method or technology. Information may be a computer readable instruction, a data structure, and a module of a program or other data. An example if the storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible by the computing device. According to the definition herein, the computer readable medium does not include transitory media, such as a modulated data signal and a carrier.

It should be further noted that the terms "include," "comprise." or any other variations thereof are intended to cover non-exclusive inclusion, so that a process, method, commodity or device including a series of elements not only includes the elements, but also includes other elements not clearly listed, or further includes inherent elements of the process, method, commodity or device. In a case without any more limitations, an element defined by "including a/an . . ." does not exclude that the process, method, commodity, or device including the element further has other identical elements.

Those skilled in the art should understand that the embodiments of the present application may be provided as a method, a system, or a computer program product. Therefore, the present application may be implemented as a complete hardware embodiment, a complete software embodiment, or an embodiment combining software and hardware. Moreover, the present application may be in the form of a computer program product implemented on one or more computer usable storage media (including, but not limited to, a magnetic disk memory, a CD-ROM, an optical memory and the like) including computer usable program code.

The present application may be described in a common context of a computer executable instruction executed by a computer, for example, a program module. Generally, the program module includes a routine, a program, an object, an assembly, a data structure, and the like used for executing a specific task or implementing a specific abstract data type. The present application may also be implemented in distributed computing environments, and in the distributed computer environments, a task is executed by using remote processing devices connected through a communications network. In the distributed computer environments, the program module may be located in local and remote computer storage media including a storage device.

The embodiments in the specification are all described progressively, identical or similar parts of the embodiments may be obtained with reference to each other, and each embodiment emphasizes a part different from other embodiments. Especially, the system embodiments provide functionality that is similar to the functionality of the method embodiments, so it is described simply. For related parts, reference may be made to the description of the parts in the method embodiment.

The above description is merely embodiments of the present application, and is not intended to limit the present application. For those skilled in the art, the present application may have various modifications and variations. Any modification, equivalent replacement, improvement or the like made without departing from the spirit and principle of the present application should all fall within the scope of claims of the present application.

The invention claimed is:
1. A method for improving security of a Java sandbox, comprising:
  performing a permission check on a to-be-checked code;
  determining whether a method bypassing the permission check exists in a call stack of the code;
  in response to the method bypassing the permission check existing, determining whether methods in the call stack have a signature; and processing the to-be-checked code based on the determination whether the methods in the call stack have the signature, wherein processing the to-be-checked code comprises:
in response to a determination that methods in the call stack have the signature, determining whether a depth of a method corresponding to the signature is greater than a depth of a privileged method, and
in response to a determination that the depth of the method corresponding to the signature is not greater than the depth of the privileged method, determining that the to-be-checked code has a security problem,
wherein processing the to-be-checked code further comprises:
acquiring preset calling information from a policy file in response to the methods having the signature,
determining whether calling information of the methods in the call stack is the same as the preset calling information, and
determining that the to-be-checked code has a security problem in response to the calling information of the methods in the call stack not being the same as the preset calling sequence.

2. The method of claim 1, wherein processing the to-be-checked code further comprises:
acquiring a preset signature from a policy file in response to the methods having the signature;
determining whether the signature of the methods in the call stack is the same as the preset signature; and
determining that the to-be-checked code has a security problem in response to the signature of the methods in the call stack being not the same as the preset signature.

3. The method of claim 1, wherein the calling information includes class names of the methods in the calls stack.

4. The method of claim 1, wherein the calling information includes a calling sequence of the methods in the calls stack.

5. The method of claim 1, wherein processing the to-be-checked code further comprises:
determining that the to-be-checked code has a security problem in response to the methods not having the signature.

6. A non-transitory computer-readable medium storing a set of one or more instructions that is executable by one or more processors of a computer system to perform a method comprising:
performing a permission check on a to-be-checked code;
determining whether a method bypassing the permission check exists in a call stack of the code;
in response to the method bypassing the permission check existing, determining whether methods in the call stack have a signature; and
processing the to-be-checked code based on the determination whether the methods in the call stack have the signature, wherein processing the to-be-checked code comprises:
in response to a determination that methods in the call stack have the signature, determining whether a depth of a method corresponding to the signature is greater than a depth of a privileged method, and
in response to a determination that the depth of the method corresponding to the signature is not greater than the depth of the privileged method, determining that the to-be-checked code has a security problem,
wherein processing the to-be-checked code further comprises:
acquiring preset calling information from a policy file in response to the methods having the signature,
determining whether calling information of the methods in the call stack is the same as the preset calling information, and
determining that the to-be-checked code has a security problem in response to the calling information of the methods in the call stack not being the same as the preset calling sequence.

7. The non-transitory computer-readable medium of claim 6, wherein processing the to-be-checked code further comprises:
acquiring a preset signature from a policy file in response to the methods having the signature;
determining whether the signature of the methods in the call stack is the same as the preset signature; and
determining that the to-be-checked code has a security problem in response to the signature of the methods in the call stack being not the same as the preset signature.

8. The non-transitory computer-readable medium of claim 6, wherein the calling information includes class names of the methods in the calls stack.

9. The non-transitory computer-readable medium of claim 6, wherein the calling information includes a calling sequence of the methods in the calls stack.

10. The non-transitory computer-readable medium of claim 6, wherein processing the to-be-checked code further comprises:
determining that the to-be-checked code has a security problem in response to the methods not having the signature.

* * * * *